Patented Aug. 3, 1948

2,446,171

UNITED STATES PATENT OFFICE 2,446,171

PREPARATION OF ACETALS

Willard J. Croxall, Bryn Athyn, and Harry T. Neher, Bristol, Pa., assignors to Röhm & Haas Company, Philadelphia, Pa., a corporation of Delaware No Drawing. Application August 27, 1945, Serial No. 613,034

13 Claims. (Cl. 260—615)

This invention relates to a process for preparing acetals. With greater particularity, it concerns a process wherein vinyl esters of a carboxylic acid are reacted with primary or secondary alcohols in the presence of a mercury compound and a strongly acidic catalyst.

The mechanism of this reaction may be accounted for at least theoretically as follows:

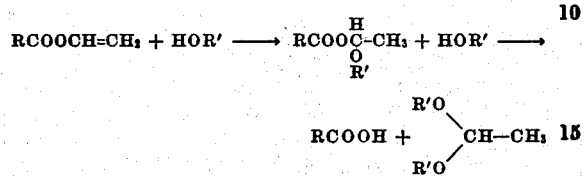

As a vinyl ester, there may be preferably used vinyl acetate, vinyl propionate, vinyl butyrate, or other carboxylic ester RCOOCH=CH₂, wherein R is the organic residue of a carboxylic acid; but other esters may be used, the carboxylic acid portion not being of importance, since it is eliminated in the reaction.

As an alcohol, R'OH, there may be used any organic compound containing a non-tertiary alcoholic hydroxyl and being free of interfering groups or groups which react with or destroy the catalysts, such as amino groups. The alcohols may be aliphatic, cycloaliphatic, arylaliphatic, or heterocyclic aliphatic. In all such compounds, the —OH group is attached to a —CH₂— or —CH= group; that is, it is aliphatically bound and is not attached directly to the carbon atom of an aryl nucleus. The alcohol may, therefore, be considered non-aromatic or aliphatic in character. Phenolic hydroxyl groups tend to give resinous products rather than acetals.

Typical alcohols which may be used are methyl, ethyl, propyl, isopropyl, n-butyl, sec.-butyl, isobutyl, the various primary and secondary amyl, hexyl, octyl, decyl, dodecyl, myristyl, cetyl, and octadecyl alcohols, allyl, methallyl, crotyl, undecenyl, and oleyl alcohols, benzyl alcohol, phenylethyl alcohol, tetrahydrofurfuryl alcohol, cyclohexanol, methyl cyclohexanol, hexahydrobenzyl alcohol, terpineol, hydroxydihydronordicyclopentadiene, hydroabietyl alcohol, methoxyethanol, ethoxyethanol, butoxyethanol, methoxyethoxyethanol, butoxyethoxyethanol, butoxypropanol, butoxyethoxypropanol, butoxypropoxypropanol, alloxyethanol, methalloxyethanol, phenoxyethanol, cresoxyethanol, phenoxypropanol, and the like, polyhydric alcohols, including ethylene glycol, propylene glycol, diethylene glycol, and the like, and substituted alcohols such as chlorohydrin, hydroxy esters such as methyl glycolate, ethyl lactate, or the like. Acetals prepared from hydroxy esters of unsaturated alcohols have been made the subject of another application, Serial No. 613,032, filed of even date.

The mercury compound taken for a catalyst is preferably mercury oxide, but this mercury compound alone is not effective. It must be used in conjunction with a strongly acidic catalyst, such as a strong mineral acid, for example sulfuric acid or tetraphosphoric acid or an "ansolvo acid," illustrated by the highly effective complexes formed with boron trifluoride. The oxide and acid together form in situ a most effective catalytic combination, which for practical purposes may be regarded as both a mercury catalyst and a strongly acidic catalyst. It is not essential, however, that the combination be formed in situ, for preformed mercury salts, such as mercury sulfate or mercury phosphate, which themselves can yield a strong acid, as by hydrolysis, may be used. The reaction was found to be promoted also by mercuric chloride, although the reaction then was not so rapid as with the combination formed in situ. Other effective catalysts are mercury acetate-sulfate and mercury acetate-trichloroacetate.

Complexes formed from boron trifluoride and an oxygenated organic compound are particularly valuable acidic catalysts in conjunction with a mercury compound. Such complexes are readily soluble in the reaction mixture, produce no troublesome by-products, and are readily disposed of at the end of the reaction. Coordination complexes of boron trifluoride and an oxygenated organic compound are typified by BF₃.O(C₂H₅)₂ or BF₃.O(C₄H₉)₂ from ethers, BF₃.2CH₃COOH from carboxylic acids,

BF₃.C₄H₉OH or BF₃.2C₂H₅OH from alcohols, BF₃.CH₃COCH₃ from ketones, or BF₃.M$_x$ in general for such coordination complexes.

The strongly acidic catalysts by themselves have not been found to lead to formation of acetals. Strong mineral acids alone instead tend to cause transesterification. Yet when both mercury in the form of a compound and a strongly acidic catalyst are present, even though in the same compound, acetal formation results. The combination of catalysts promotes the rather surprising reaction of an alcohol with an ester with displacement of a carboxylic acid.

There are required only catalytic amounts of mercury compound and of strongly acidic catalyst for the promotion of the acetal reaction. As small amounts as ½ gram of mercury compound and ½ gram of strongly acidic catalyst per gram mol of vinyl ester give relatively rapid conversions and fair yields of acetals. Smaller amounts of catalysts are effective, however, even though the yields may fall off slightly. One gram portions of both mercury compound and strongly acidic catalyst per gram mol or vinyl ester, on the other hand, appear about optimum in respect to both rate of reaction and yield with economy of time, materials, and effort. Higher proportions may be used, even 10 grams of both per gram mol of ester being satisfactory.

The optimum ratio of vinyl ester to alcohol is about the theoretical one (one to two), but, even with ratios of one to one, the final product can be carried primarily to the acetal, particularly if vinyl ester is added to alcohol. With such low ratios, some hemiacetal esters are usually formed, particularly when alcohol is added to vinyl ester, but these hemiacetal esters are readily converted to acetals with additional alcohol. If desired, the hemiacetal esters may be formed with one alcohol and these esters converted to mixed acetals with a different alcohol. Excess alcohol in the reaction is oftentimes desirable, serving as a convenient solvent medium. Other solvents, such as the hydrocarbons, may, however, be used.

The reactions of this invention may be effected at temperatures from below room temperature, such as 0° to 10° C., up to temperatures of 65° to 75° C. The preferred temperature range is 25° to 50° C. Since in some cases it has been observed that side reactions occur as the temperature is raised, it is desirable to control temperature, as reactants are mixed, by conventional methods such as rate of addition of one component to the other or by external cooling.

When the reaction has been effected, the acidic catalyst is desirably destroyed, as by addition of an alkaline reacting material. Alternatively, both catalyst and acid formed in the reaction may be neutralized. The acetals may then be readily separated by extraction or distillation or other suitable method and may be readily purified.

By the method of this invention, there may be obtained not only known acetals but also many acetals which have not hitherto been prepared. The products have a wide utility. They are useful, for example, as intermediates for the preparation of many other types of compounds, including many not prepared before. They also serve as solvents and plasticizers.

Specific details of typical preparations of various acetals are provided by the following examples.

Example 1

There were placed in a reaction vessel equipped with stirrer, thermometer, reflux condenser, and dropping funnel 348 grams of allyl glycolate, $HOCH_2COOCH_2CH=CH_2$, one gram of mercury oxide, and one milliliter of the coordination complex of methyl alcohol and boron trifluoride. To this mixture there was added during the course of about one hour 135 grams of vinyl acetate. The temperature of the reaction mixture was controlled at 25° to 35° C. by a cooling bath. The reaction mixture was then stirred for three and a half hours, whereupon three hundred milligrams of water was added followed by eighty grams of soda ash in successive small portions. The amount of soda ash corresponded to that required for neutralization of the reaction mixture.

An oil layer formed and was separated from an aqueous layer. The oil layer was dried over anhydrous potassium carbonate and distilled under reduced pressure at 110°–140° C. at 3 mm. The yield of product was 333 grams. The distillate was carefully fractionated through a column packed with an aluminum jack chain. The main fraction was collected at 140° C. at 2 mm. and was identified as allyl glycolate acetal.

Example 2

The reaction vessel was charged with 160 grams of methanol, two grams of mercuric oxide, and two milliliters of the methyl alcohol-boron trifluoride complex used above. There was added 260 grams of vinyl acetate with stirring. The temperature was held at 50°–60° C. The reaction mixture was then stirred for about an hour and then treated with about two grams of potassium carbonate to destroy the acidic catalyst. The liquid was then distilled. A fraction boiling at 55° to 68° C., amounting to 231 grams, was methyl acetal. An intermediate fraction was then taken, amounting to 21 grams. Then a fraction was taken at 110° C. to 117° C., which was acetic acid. The first fraction was analyzed and found to contain 99% methyl acetal, corresponding in its properties with those described in the literature.

Example 3

There were mixed vinyl acetate (one mol), allyl lactate (four mols), mercuric oxide (one gram), and $C_4H_9OH.BF_3$ (two milliliters) at 25° to 50° C. The reaction mixture was stirred for several hours, treated with water, and neutralized with sodium carbonate. The resulting oil layer was separated, dried, and distilled under reduced pressure. The fraction boiling at 134°–136° C. at 3 mm. was found to be pure allyl lactate acetal.

Example 4

To a mixture of eight gram mols of allyl alcohol, one gram of mercuric oxide, and two milliliters of $CH_3OHBF_3$ there was slowly added one gram mol of vinyl acetate. The temperature was held below 50° C. by cooling. After the reaction mixture had been stirred for two hours, it was treated with water and neutralized with soda ash. The resulting oil layer was separated, dried, and fractionated. The fraction boiling at 148° to 150° C., amounting to 65% of the estimated yield, was found to be pure allyl acetal.

Example 5

The procedure of Example 4 was followed with substitution of isopropanol for the allyl alcohol. The fraction boiling at 125° to 128° C. was found to be pure isopropyl acetal.

Example 6

A mixture of four gram mols of ethyl alcohol, two grams of mercuric oxide, and two milliliters of $CH_3OH.BF_3$ was placed in a reaction vessel and one gram mol of vinyl acetate slowly added. The reaction temperature was 40° to 52° C. and the stirring time after combination of reactants about two hours. The reaction mixture was then carefully neutralized with a dilute alkali solution and the oil layer separated, washed, dried, and distilled. A yield of 92.5% of ethyl acetal was obtained.

Use of vinyl butyrate in place of the above acetate yields ethyl acetal likewise.

Example 7

To a stirred mixture of two gram mols of n-butyl alcohol, one gram of red mercuric oxide, and one milliliter of $CH_3OH.BF_3$ there was slowly added vinyl acetate to the extent of 1.1 gram mols. The reaction mixture was held at 45° to 50° C., stirred for two hours, and neutralized with 0.51 gram mol of soda ash. The fraction which distilled at 188° to 193° C. was found to be butyl acetal and corresponded to a yield of 88%.

The substitution of an equal molecular proportion of vinyl propionate leads to butyl acetal.

Example 8

To a mixture of two gram mols of 2-ethyl hexyl alcohol, one gram of mercuric oxide, and one milliliter of $CH_3OH.BF_3$ there was slowly added 0.9 mol of vinyl acetate. The temperature was held at 45° to 50° C. The mixture was then stirred for several hours, treated with water, neutralized, and separated. The oil layer was distilled under reduced pressure. The fraction boiling at 150°–155° C. at 10 mm. was 2-ethyl hexyl acetal in a yield of 86%.

Example 9

The procedure of Example 8 was followed, substituting a commercial dodecyl alcohol (from coconut oil by hydrogenation and fractionation). A 94% yield of the corresponding acetal was obtained, distilling at 200° C. at 3 mm. pressure.

Example 10

To a mixture of two gram mols of butoxyethanol, one gram of mercury oxide, and one milliliter of the coordination complex of boron trifluoride and ethanol, there was gradually added vinyl acetate (1.1 mols) while the mixture was stirred and maintained at about 45° to 50° C. The reaction mixture was stirred several hours and then neutralized, and the oil layer was separated and worked up as above. The fraction distilled at 145°–147° C. at 9 mm. pressure was the desired acetal.

Example 11

A mixture of two gram mols of vinyl acetate, one gram of mercuric oxide, and two grams of the boron trifluoride-acetic acid complex was reacted with two gram mols of ethylene chlorohydrin at 0° to 10° C. After this reaction mixture had been stirred for a while, two gram mols of allyl alcohol were added and the reaction mixture left stirring overnight. Thereupon, it was neutralized, washed, and fractionated. The fraction boiling at 76° to 82° C. at 15 mm. was primarily the mixed chloroethyl allyl acetal.

Example 12

A mixture of five gram mols of ethylene chlorohydrin, one gram of mercury oxide, and two milliliters of $CH_3OH.BF_3$ was reacted with a gram mol of vinyl acetate at 44°–48° C. After the reaction mixture had been washed, it was separated, dried, and distilled. The fraction boiling at 105° to 106° C. at 13 mm. was β-chloroethyl acetal. The yield was 52%.

Example 13

Four gram mols of vinyl acetate were reacted with four gram mols of ethylene glycol, with two grams of mercury oxide and four milliliters of $CH_3OH.BF_3$ serving as the catalysts. The reaction mixture was neutralized, washed, and separated. The oil layer contained the cyclic acetal, 4-methyl dioxolane, boiling at 82° C. This compound may also be called 2-methyl-1,3-dioxolane, the numbering in this case being based on the ring system with the numbering indicated

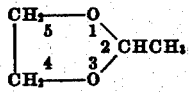

Example 14

To a mixture of two gram mols of butoxyethoxyethanol, one gram of mercury oxide, and one milliliter of $CH_3OH.BF_3$ there was added at 45°–50° C. 1.1 gram mols of vinyl acetate. The reaction mixture was stirred for two hours, neutralized, and separated. An 82% yield of the desired acetal was obtained, boiling at 158°–160° C. at 2 mm.

Example 15

The procedure of Example 14 was followed with substitution of 2-ethyl hexoxyethanol as the alcohol. A yield of 73% of hexoxyethyl acetal was obtained, distilling at 189°–191° C. at 2 mm.

Example 16

To a mixture of four gram mols of methyl alcohol, one gram of mercury oxide, and 0.5 cc. of concentrated sulfuric acid, there was added at 45° to 55° C. two gram mols of vinyl acetate. The mixture was stirred for about forty-five minutes and then worked up with neutralization and distillation. A yield of 65% of the desired acetal was obtained.

Example 17

To a mixture of two gram mols of vinyl acetate, one gram of mercury oxide, and one milliliter of $CH_3OH.BF_3$, there was added at about 20° C. two gram mols of methyl alcohol. Then, two gram mols of n-butyl alcohol were run in and the temperature allowed to rise to 35° C. The reaction mixture was stirred for about twenty minutes and then neutralized. The product obtained was predominantly the mixed methyl butyl acetal.

Example 18

To a mixture of 138 grams of phenoxyethanol, one gram of mercury oxide, and one milliliter of methyl alcohol-boron trifluoride catalyst, there was added at about 40° C. 43 grams of vinyl acetate. The temperature gradually rose to 60° C. and stirring was continued, after all of the ester had been added, for about twenty minutes. Thereupon two grams of potassium carbonate were added and stirred into the reaction mixture. The mixture was settled, decanted, and distilled under reduced pressure. Acetic acid was taken off up to 60° C. at 11 mm. and an intermediate fraction of 30 grams from 60° C. to 184° C. at 2 mm. Then the main fraction, amounting to 98 grams of phenoxyethyl acetal, distilled at 184°–186° C./2 mm.

We claim:

1. A process for preparing acetals which comprises reacting by mixing a vinyl ester of a carboxylic acid, $RCOOCH=CH_2$, wherein R is an alkyl group of one to three carbon atoms, with more than an equivalent proportion of a non-tertiary alcohol of the formula R'OH wherein R' is a hydrocarbon group under controlled conditions between about 0° and 75° C. in the presence of a mercury catalyst and a strongly acidic catalyst, destroying the acidic catalyst in the reaction mixture, and separating therefrom an acetal.

2. A process for preparing acetals which comprises reacting by mixing a vinyl ester of a monocarboxylic unsubstituted saturated aliphatic acid of two to four carbon atoms with more than an equivalent proportion of a primary alcohol of the formula R'OH wherein R' is a hydrocarbon group of one to eighteen carbon atoms under controlled conditions of temperature between 0° and 75° C. in the presence of a mercury catalyst and a strongly acidic catalyst, destroying the acidic catalyst in the reaction mixture, and separating therefrom an acetal.

3. A process for preparing acetals which comprises reacting by mixing a vinyl ester of a monocarboxylic unsubstituted saturated aliphatic acid of two to four carbon atoms with more than an equivalent proportion of a secondary alcohol of the formula R'OH wherein R' is a hydrocarbon group of one to eighteen carbon atoms under controlled conditions of temperature between 0° and 75° C. in the presence of a mercury catalyst and a strongly acidic catalyst, destroying the acidic catalyst in the reaction mixture, and separating therefrom an acetal.

4. A process for preparing acetals which comprises reacting by mixing vinyl acetate with more than an equivalent proportion of a non-tertiary alcohol of the formula R'OH wherein R' is a hydrocarbon group under controlled conditions of temperature between 0° and 75° C. in the presence of a mercury catalyst and a strongly acidic catalyst, destroying the acidic catalyst in the reaction mixture, and separating therefrom an acetal.

5. A process for preparing acetals which comprises reacting by mixing vinyl acetate with more than an equivalent proportion of a non-tertiary alcohol of the formula R'OH wherein R' is a hydrocarbon group under controlled conditions of temperature between 0° and 75° C. in the presence of catalytic amounts of mercury oxide and a boron trifluoride coordination complex of an oxygenated organic compound, neutralizing the reaction mixture, and separating therefrom an acetal.

6. A process for preparing acetals which comprises reacting by mixing vinyl acetate with more than an equivalent proportion of a primary alcohol of the formula R'OH wherein R' is a hydrocarbon group of one to eighteen carbon atoms under controlled conditions of temperature between 0° and 75° C. in the presence of a small amount of mercury oxide and a boron trifluoride coordination complex of an oxygenated organic compound, neutralizing the reaction mixture, and separating therefrom an acetal.

7. A process for preparing acetals which comprises reacting by mixing vinyl acetate with more than an equivalent proportion of a secondary alcohol of the formula R'OH wherein R' is a hydrocarbon group of one to eighteen carbon atoms under controlled conditions of temperature between 0° and 75° C. in the presence of a small amount of mercury oxide and a boron trifluoride coordination complex of an oxygenated organic compound, neutralizing the reaction mixture, and separating therefrom an acetal.

8. A process for preparing acetals which comprises reacting by mixing a vinyl ester of a saturated aliphatic monocarboxylic acid of two to four carbon atoms with more than an equivalent proportion of a non-tertiary alcohol of the formula R'OH wherein R' is a hydrocarbon group of not over eighteen carbon atoms under controlled conditions of temperature between 25° and 50° C. in the presence of small amounts of mercury oxide and a boron trifluoride catalyst, neutralizing the reaction mixture, and separating therefrom an acetal.

9. A process for preparing acetals which comprises reacting by mixing one mol of vinyl acetate and two mols of a primary monohydric aliphatic alcohol of the formula R'OH wherein R' is an aliphatic hydrocarbon radical of one to eighteen carbon atoms in the presence of small amounts of mercury oxide and a boron trifluoride catalyst while maintaining the temperature between 25° and 50° C., neutralizing the reaction mixture, and separating therefrom an acetal.

10. A process for preparing acetals which comprises reacting by mixing one mol of vinyl acetate and two mols of a secondary monohydric aliphatic alcohol of the formula R'OH wherein R' is an aliphatic hydrocarbon radical of one to eighteen carbon atoms in the presence of small amounts of mercury oxide and a boron trifluoride catalyst while maintaining the temperature between 25° and 50° C., neutralizing the reaction mixture, and separating therefrom an acetal.

11. A process for preparing acetals which comprises reacting by mixing one mol of vinyl acetate with two mols of a non-tertiary monohydric aliphatic alcohol of the formula R'OH wherein R' is an aliphatic hydrocarbon group of one to eighteen carbon atoms in the presence of small amounts of mercury oxide and a boron trifluoride catalyst while maintaining the temperature of the reaction mixture between 25° and 50° C., neutralizing the reaction mixture, and separating therefrom an acetal.

12. A process for preparing allyl acetal which comprises reacting between 25° C. and 50° C. in the presence of mercury oxide and a boron trifluoride catalyst one mole of vinyl acetate and two moles of allyl alcohol, destroying the acidity of the reaction mixture, and separating therefrom allyl acetal.

13. A process for preparing 2-ethylhexyl acetal which comprises reacting between 0° C. and 75° C. in the presence of mercury oxide and a boron trifluoride catalyst one mole of vinyl acetate and two moles of 2-ethylhexyl alcohol, destroying the acidity of the reaction mixture, and separating therefrom 2-ethylhexyl acetal.

WILLARD J. CROXALL.
HARRY T. NEHER.

REFERENCES CITED

The following references are of record in the file of this patent:

FOREIGN PATENTS

| Number | Country | Date |
|---|---|---|
| 314,646 | Great Britain | May 14, 1928 |